(12) United States Patent
Nelböck et al.

(10) Patent No.: US 7,810,625 B2
(45) Date of Patent: Oct. 12, 2010

(54) SINTERED CLUTCH RING

(75) Inventors: Günter Nelböck, Seewalchen (AT);
Alexander Weiermair, Eberstalzell (AT); Franz Heitzinger, Bad Wimsbach/Neydharting (AT)

(73) Assignee: Miba Sinter Austria GmbH, Laakirchen (AT)

( * ) Notice: Subject to any disclaimer, the term of this patent is extended or adjusted under 35 U.S.C. 154(b) by 614 days.

(21) Appl. No.: 11/793,933

(22) PCT Filed: Nov. 14, 2005

(86) PCT No.: PCT/AT2005/000451

§ 371 (c)(1),
(2), (4) Date: Jul. 6, 2007

(87) PCT Pub. No.: WO2006/066287

PCT Pub. Date: Jun. 29, 2006

(65) Prior Publication Data

US 2008/0110718 A1    May 15, 2008

(30) Foreign Application Priority Data

Dec. 23, 2004    (AT) .................................. 2153/2004

(51) Int. Cl.
*F16D 11/14*    (2006.01)
*B22F 5/08*    (2006.01)

(52) U.S. Cl. ................ 192/108; 148/514; 192/69.83

(58) Field of Classification Search ................ 192/108, 192/114 T
See application file for complete search history.

(56) References Cited

U.S. PATENT DOCUMENTS

| | | | | |
|---|---|---|---|---|
| 3,367,462 A | * | 2/1968 | Bibbens | 192/55.2 |
| 4,905,806 A | * | 3/1990 | Hillenbrand et al. | 192/53.343 |
| 5,538,119 A | * | 7/1996 | Johnson, Jr. | 192/53.34 |
| 5,701,574 A | | 12/1997 | Derflinger et al. | |
| 5,960,925 A | * | 10/1999 | Helms et al. | 192/108 |
| 6,296,100 B1 | * | 10/2001 | Schetter et al. | 192/108 |
| 6,370,979 B1 | * | 4/2002 | Tauschek et al. | 74/462 |
| 6,680,024 B1 | * | 1/2004 | Grundner | 419/38 |

(Continued)

FOREIGN PATENT DOCUMENTS

DE    845 903 C    8/1952

(Continued)

OTHER PUBLICATIONS

International Search Report, May 8, 2006.

*Primary Examiner*—Rodney H Bonck
(74) *Attorney, Agent, or Firm*—Collard & Roe, P.C.

(57) ABSTRACT

A sintered clutch ring (1) is described, comprising a rim of clutch teeth (2) which comprise wedge-like face surfaces (3, 4) intersecting in an axial plane and flanks (5) sloping downwardly under an angle of inclination from the tooth back (6) against the tooth root, with the flanks (5) being relieved starting from a re-entrant, axially normal shoulder (7). In order to provide advantageous conditions for press forming the flank reliefs it is proposed that the planes of intersection between the wedge-like face surfaces (3, 4) extend outside of the center of the teeth and that the mutually axially offset shoulders (7) of the two flanks (5) of the clutch teeth (2) separate the relieved flanks (5) from a paraxial flank portion (8) which is substantially triangular and is adjacent to the face surfaces (3, 4).

2 Claims, 2 Drawing Sheets

U.S. PATENT DOCUMENTS

| | | | |
|---|---|---|---|
| 2002/0100655 A1* | 8/2002 | Patzner et al. | 192/53.1 |
| 2003/0183479 A1* | 10/2003 | Rau et al. | 192/108 |

FOREIGN PATENT DOCUMENTS

| | | |
|---|---|---|
| DE | 195 42 924 A1 | 6/1996 |
| DE | 196 04 386 A1 | 8/1996 |
| EP | 0 195 706 A1 | 9/1986 |
| EP | 1 464 874 A1 | 10/2004 |
| JP | 04 064748 A | 2/1992 |
| WO | WO 01/08838 A1 | 2/2001 |

* cited by examiner

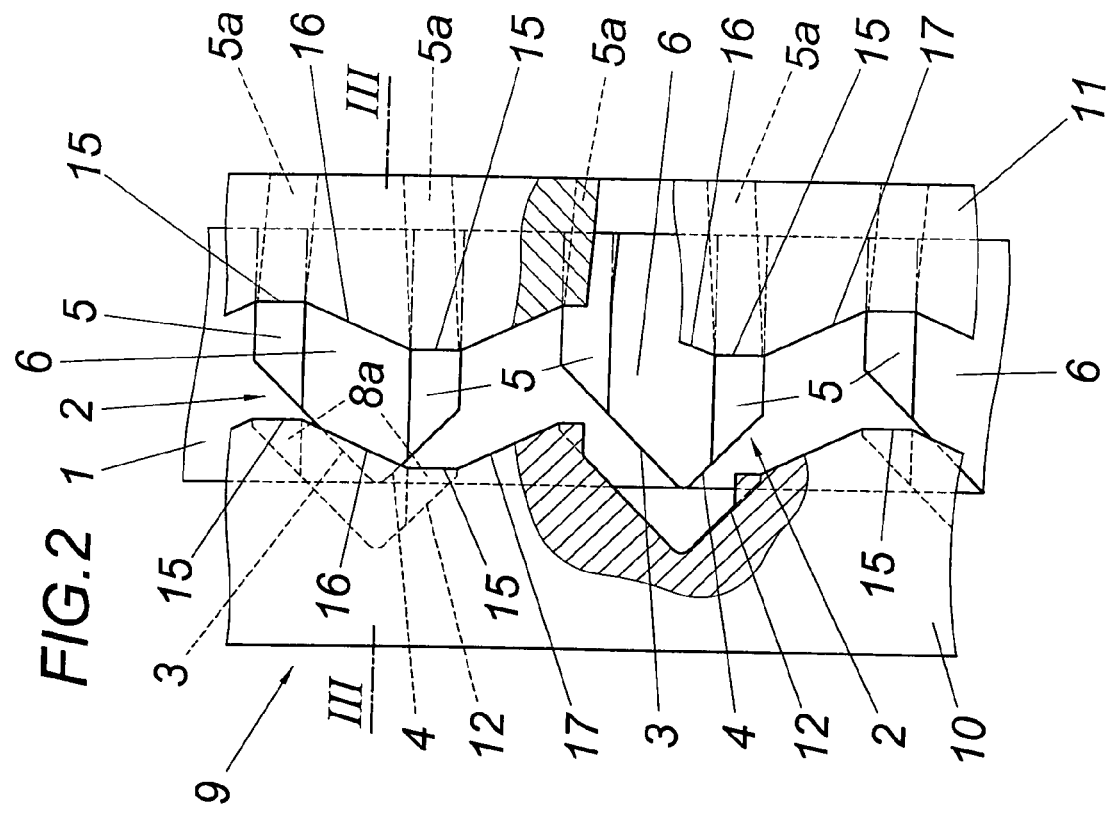
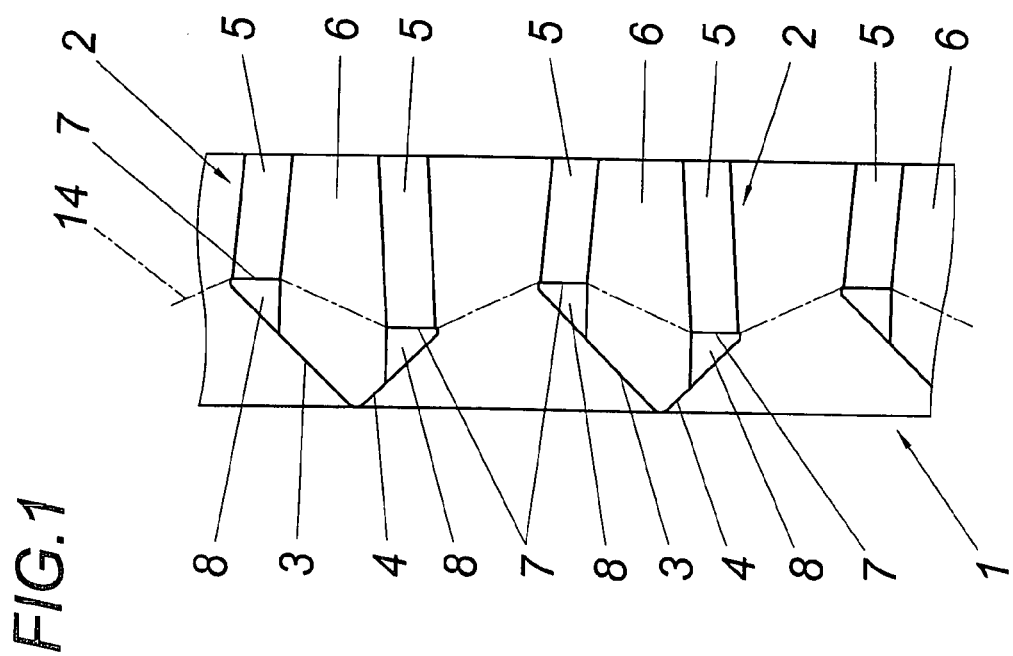

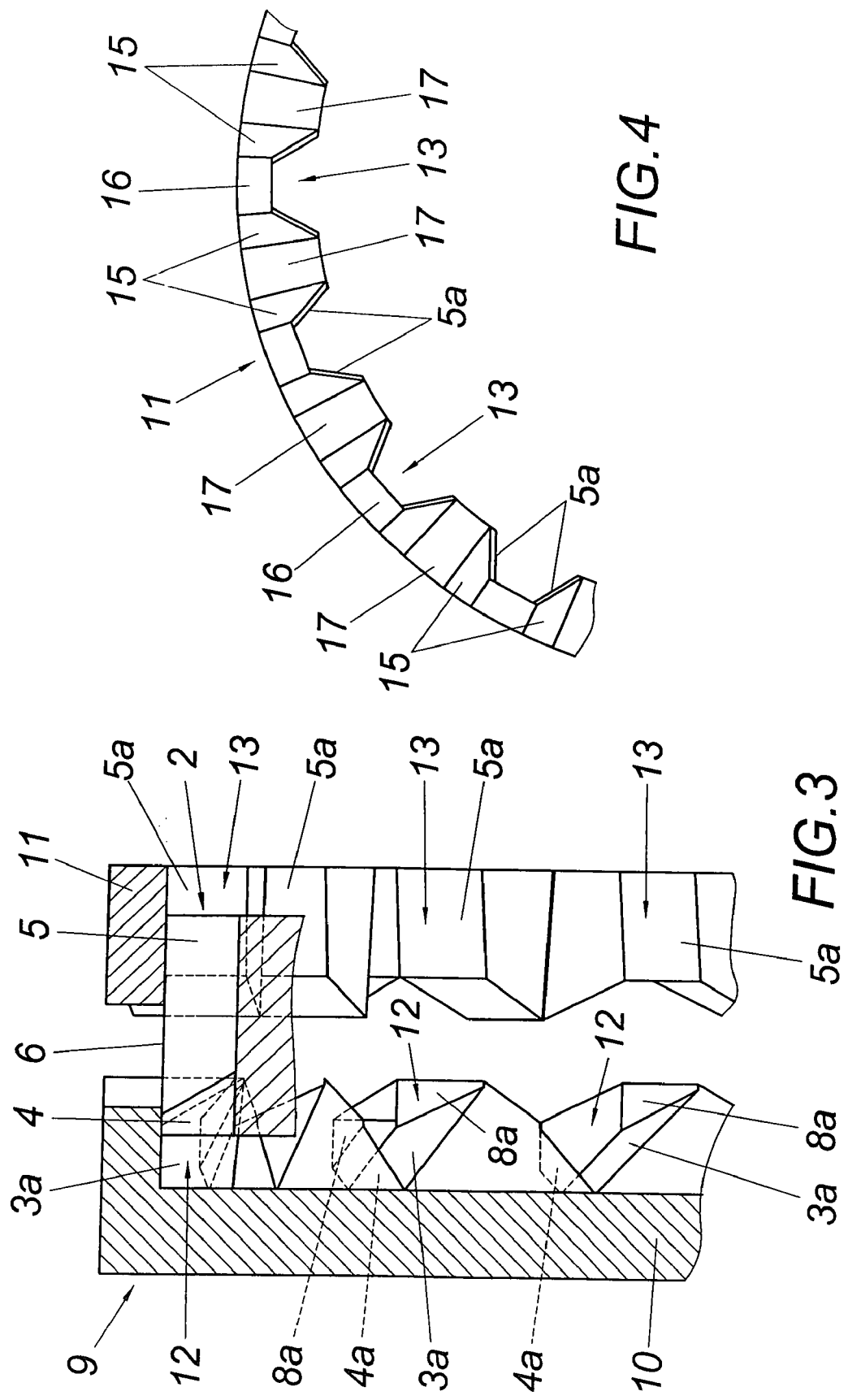

SINTERED CLUTCH RING

CROSS REFERENCE TO RELATED APPLICATIONS

Applicants claim priority under 35 U.S.C. §119 of Austrian Application No. A 2153/2004 filed Dec. 23, 2004. Applicants also claim priority under 35 U.S.C. §365 of PCT/AT2005/000451 filed Nov. 14, 2005. The international application under PCT article 21(2) was not published in English.

FIELD OF THE INVENTION

The invention relates to a sintered clutch ring with a rim of clutch teeth which comprise wedge-like face surfaces intersecting in an axial plane and flanks sloping downwardly under an angle of inclination from the tooth back against the tooth root, with the flanks being relieved starting from a re-entrant, axially normal shoulder.

DESCRIPTION OF THE PRIOR ART

Transmissions for motor vehicles comprise clutch rings which cooperate with a selector sleeve and whose clutch teeth form wedge-like face surfaces extending in a roof-like manner on the side facing the selector sleeve, which face surfaces facilitate the engagement of the claws of the selector sleeve in the gear rim of the clutch ring. By providing relief of the flanks of the clutch teeth, the engagement position of the claws of the selector shaft is secured in the axial direction. In order to produce the relief of the flanks, the clutch teeth are subjected in the case of a power-metallurgical production of the clutch rings to press forming between two molds of a form tool which are axially pressed against each other. In order to avoid the formation of fins in the region of the partition plane of the form tool and thus aftertreatment of the clutch ring, it has already been proposed (WO 01/08838 A1) that during form pressing of the relief of the flanks in the transitional region between the flanks and the wedge-like face surfaces a shoulder which re-enters on the flank side and is situated in the partition plane of the form tools is pressed into the flanks of the clutch teeth with a rounded transitional region to the wedge-like face surfaces. As a result of the re-entrant shoulder, it is not possible that a fin-like accumulation of material occurs in the transitional region from the wedge-like face surfaces to the flanks, which accumulation would impair the engagement movement of the claws of the selector sleeve. The re-entrant shoulders have no influence on the engagement movement of the claws of the selector shaft into the rim of the clutch teeth. The precondition for such advantageous form pressing of the sintered clutch ring is a configuration of the clutch teeth which is symmetrical with respect to an axial plane. An asymmetrical arrangement of the wedge-like face surfaces of the clutch teeth offers advantages with respect to the switching process and the load on the wedge-like face surfaces under a predetermined direction of rotation, because the face surfaces which are relevant for the guidance of the claws of the selector sleeve form a respectively longer sliding surface.

SUMMARY OF THE INVENTION

The invention is thus based on the object or providing a clutch ring of the kind mentioned above in such a way that the reliefs of the flanks can be produced by form pressing of the sintered clutch ring despite an asymmetrical configuration of the wedge-like face surfaces.

This object is achieved by the invention in such a way that the planes of intersection between the wedge-like face surfaces extend outside of the center of the teeth and that the mutually axially offset shoulders of the two flanks of the clutch teeth separate the relieved flanks from a paraxial flank part which is substantially triangular and is adjacent to the face surfaces.

Since as a result of this measure the re-entrant shoulders do not extend along the inclined transitional region from the wedge-like face surfaces to the flanks, but instead along an axially normal plane, so that the shoulders separate the relieved flanks from a paraxial flank part which is substantially triangular and is adjacent to the face surfaces, advantageous preconditions for form pressing of the relieved flanks can be ensured despite the asymmetric arrangement of the wedge-like face surfaces, because the separating surface between the two molds of a form tool can be formed in the flank region by axially normal, parallel sections between which connecting surfaces must be provided which bridge the axial offset of the shoulders. The substantially triangular, paraxial flank parts adjacent to the wedge-like face surfaces neither obstruct the engagement of the claws of the selector sleeve, nor their axial securing by the relieved flanks of the teeth.

Based on a sintered clutch ring with paraxial tooth flanks, the flank relief can be produced by means of the shoulders which are mutually axially offset and each extend along an axially normal plane with the help of a form tool made of two molds which can be pressed axially against each other, of which one forms the hollow mold for the clutch teeth in the region of the wedge-like face surfaces and the other the hollow mold for the clutch teeth in the region of the relieved flanks, with the partition surface between the two molds extending along the paraxial shoulders delimiting the relieved flanks. The relevant aspect is that the partition surface between the two molds is composed of plane sections which extend in the region of the flanks along the re-entrant shoulders in an axially normal manner and extend in the region of the tooth backs and tooth gaps in an inclined manner according to the axial direction between sections which are axially offset against each other between the same according to the axial offset. With such a partition surface it is not only possible to form the flank reliefs with the re-entrant shoulders in a subsequent manner, but otherwise required centering measures for the molds of the form tool can be omitted, because an automatic mutual centering of the molds is given by the sections of the partition surface which extend in the region of the tooth backs and the tooth gaps in an inclined manner in the opposite direction, which has an advantageous effect on the production tolerances of the flank reliefs.

BRIEF DESCRIPTION OF THE DRAWINGS

The subject matter of the invention is shown in the drawing by way of example, wherein:

FIG. 1 shows a sintered clutch ring in accordance with the invention in a sectional developed top view of the gear rim of the clutch;

FIG. 2 shows an illustration according to FIG. 1 of the sintered clutch ring between the partly opened molds of the form tool;

FIG. 3 shows a sectional view along line III-III of FIG. 2, and

FIG. 4 shows a sectional face view of the mold with the hollow mold for the clutch teeth in the region of the relieved flanks on a smaller scale.

DESCRIPTION OF THE PREFERRED EMBODIMENTS

As can be seen from FIG. 1, the sintered clutch ring 1 comprises a rim of clutch teeth 2 which form wedge-like face surfaces 3, 4 on a face side, which face surfaces intersect in an axial plane extending outside of the center of the teeth, thus leading to an asymmetrical arrangement for the wedge-like face surfaces 3, 4. Said face surfaces 3, 4 converge into flanks 5 which slope downwardly from the tooth back 6 to the tooth root and which are relieved. The relieved flanks 5 are delimited by re-entrant shoulders 7 which each extend in an axially normal plane and separate the relieved flanks 5 from a paraxial flank portion 8 which is substantially triangular and is adjacent to the face surfaces 3, 4. The height of the shoulders 7 can be small and can be between 0.01 and 0.2 mm for example.

For producing the flank reliefs delimited by the shoulders 7, a sintered clutch ring 1 is used in accordance with FIG. 2 whose clutch teeth 2 has paraxial flanks 5. For form pressing the relieved flanks 5 which are offset by the shoulders 7, a form tool 9 is used which consists of two molds 10 and 11, of which mold 10 forms the hollow mold 12 for the clutch teeth 2 in the region of the wedge-like face surfaces 3, 4 and the other mold 11 forms the hollow mold 13 for the clutch teeth 2 in the region of the relieved flanks 5. The mold surfaces of the mold 10 corresponding to the wedge surfaces 3, 4 are designated with reference numerals 3a and 4a, whereas the mold surfaces corresponding to the triangular flank parts 8 are designated with reference numeral 8a. The mold surfaces of mold 11 belonging to the relieved flanks 5 have the reference numeral 5a.

As a result of the axially normal extension of the shoulders 7 of flanks 5, a progress 14 is obtained for the partition surfaces between the two molds, as is shown in FIG. 1 with the dot-dash line. Said progress 14 shows that the partition surfaces in the region of the shoulders 7 comprise axially normal, plane sections 15 which are joined by sections 16 an 17 which are inclined in opposite directions in the region of the tooth backs 6 and the tooth gaps, as is shown especially in FIGS. 2 and 4.

As a result of this partition surface of molds 10 and 11 as is composed of the plane sections 15, 16 and 17, the flank reliefs starting out from the re-entrant shoulders can be produced in an advantageous manner by press forming. The sections 16 and 17 which are inclined in opposite directions cause a mutual self-centering of the molds 10 and 11, thus leading to overall simple production conditions by securing high production precision.

The invention claimed is:

1. A sintered clutch ring with a clutch ring axis and a rim of clutch teeth, each clutch tooth having a respective longitudinal axis and comprising respective first and second wedge-like face surfaces intersecting in a respective axial plane, the clutch ring axis lying in each of said axial planes, a respective tooth back, a respective tooth root, and respective first and second flanks, each of said first and second flanks sloping at an angle of inclination from the tooth back towards the tooth root, with the first and second flanks being relieved starting from respective first and second reentrant shoulders axially normal to the longitudinal axis, wherein each axial plane between the respective first and second wedge-like face surfaces extends offset from a respective tooth center along the longitudinal axis of the clutch tooth in a circumferential direction and wherein the first and second reentrant shoulders are axially offset from each other and separate the relieved first and second flanks from respective first and second substantially triangular, axially parallel flank portions adjacent to the first and second wedge-like face surfaces, respectively.

2. A form tool for producing a clutch ring according to claim 1, the form tool comprising first and second molds having a partition surface, wherein the first and second molds can be pressed axially against each other, the first mold forming a first hollow mold for the clutch teeth in the region of the wedge-like face surfaces and the second mold forming a second hollow mold for the clutch teeth in the region of the relieved flanks, with the partition surface extending along the reentrant shoulders delimiting the relieved flanks, wherein the partition surface is composed of plane sections which extend in the region of the flanks along the reentrant shoulders in an axially normal manner and extend in the region of tooth backs of each clutch tooth of the clutch ring and tooth gaps between the tooth backs in an inclined manner corresponding to the axial offset between the shoulders.

* * * * *